United States Patent
Lipcsei et al.

(10) Patent No.: US 7,098,642 B2
(45) Date of Patent: *Aug. 29, 2006

(54) CONTROLLER FOR DC TO DC CONVERTER

(75) Inventors: Laszlo Lipcsei, San Jose, CA (US); Serban-Mihai Popescu, Campbell, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/037,598

(22) Filed: Jan. 18, 2005

(65) Prior Publication Data

US 2005/0134247 A1    Jun. 23, 2005

Related U.S. Application Data

(63) Continuation of application No. 10/668,459, filed on Sep. 23, 2003, now Pat. No. 6,844,710, which is a continuation-in-part of application No. 10/389,037, filed on Mar. 14, 2003.

(60) Provisional application No. 60/425,553, filed on Nov. 12, 2002.

(51) Int. Cl.
   *G05F 1/44*    (2006.01)

(52) U.S. Cl. ..................... 323/284; 323/285
(58) Field of Classification Search ........ 323/282–288, 323/351, 222, 224, 225, 268, 272; 363/16, 363/17, 20, 19, 21.7
See application file for complete search history.

(56) References Cited

U.S. PATENT DOCUMENTS

| | | | |
|---|---|---|---|
| 5,959,441 A | 9/1999 | Brown | 323/282 |
| 6,137,240 A | 10/2000 | Bogdan | 315/307 |
| 6,215,288 B1 * | 4/2001 | Ramsey et al. | 323/224 |
| 6,313,616 B1 | 11/2001 | Deller et al. | 323/282 |
| RE37,609 E * | 3/2002 | Bittner | 323/272 |
| 6,366,070 B1 | 4/2002 | Cooke et al. | 323/284 |
| 6,396,252 B1 * | 5/2002 | Culpepper et al. | 323/285 |

* cited by examiner

*Primary Examiner*—Rajnikant B. Patel
(74) *Attorney, Agent, or Firm*—Grossman, Tucker, Perreault & Pfleger PLLC

(57) ABSTRACT

A method includes starting a time count of a time interval at a start of a state change of a switch of a DC to DC converter; monitoring if the switch is in a skip mode; and disabling the skip mode in response to an expiration of the time interval so that the switch changes states at a frequency rate greater than an audible frequency for humans.

16 Claims, 11 Drawing Sheets

CONTROLLER FOR DC TO DC CONVERTER

CROSS REFERENCE TO RELATED APPLICATIONS

This application is a continuation of U.S. Nonprovisional application Ser. No. 10/668,459 filed on Sep. 23, 2003, now U.S. Pat. No. 6,844,710, the teachings of which are incorporated herein by reference, which itself is a continuation-in-part application of U.S. Nonprovisional application Ser. No. 10/389,037 filed Mar. 14, 2003, the teachings of which are also incorporated herein by reference, all of which claim the benefit of the filing date of U.S. Provisional Application Ser. No. 60/425,553, filed Nov. 12, 2002, the teachings of which are also incorporated herein by reference.

FIELD OF THE INVENTION

The present invention relates to controllers for DC to DC converters and in particular to controllers for controlling inductor current levels without directly measuring such current levels.

BACKGROUND OF THE INVENTION

DC to DC converters are used to convert an input DC voltage to an output DC voltage. Such converters may step down (buck) or step up (boost) the input DC voltage. One type of buck converter is a synchronous buck converter. This converter typically has a controller, driver, a pair of switches, and an LC filter coupled to the pair of switches. The controller provides a control signal to the driver which then drives the pair of switches, e.g., a high side switch and a low side switch. The driver alternately turns each switch ON and OFF thereby controlling inductor current and the output voltage of the DC to DC converter. Such controllers typically utilize a pulse width modulated signal to control the state of the high and low side switches.

In general, if the PWM signal is high, the high side switch is ON and the low side switch if OFF. This state of switches will be referred to herein as a "switch ON" state. In this state, the inductor is coupled to the input voltage source. In a buck converter, the input voltage is necessarily greater than the output voltage so there is a net positive voltage across the inductor in this switch ON state. Accordingly, the inductor current begins to ramp up. If the PWM signal is low, the high side switch is OFF and the low side switch is ON. This state of switches will be referred to as a "switch OFF" state. In a buck converter, there is a net negative voltage across the inductor in this state. Accordingly, the inductor current begins to ramp down during this low side switch OFF state. Hence, the pulse width of the PWM signal determines the time on for the switch ON state and the time off for the switch OFF state. Such pulse width may be adjusted by directly monitoring the inductor current level via a sense resistor or by comparing the output voltage with a reference voltage level.

Accordingly, there is a need in the art for a controller for a DC to DC converter that provides a PWM signal during a first time interval based on an input voltage to the DC to DC converter less a signal representative of the output voltage.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1A:
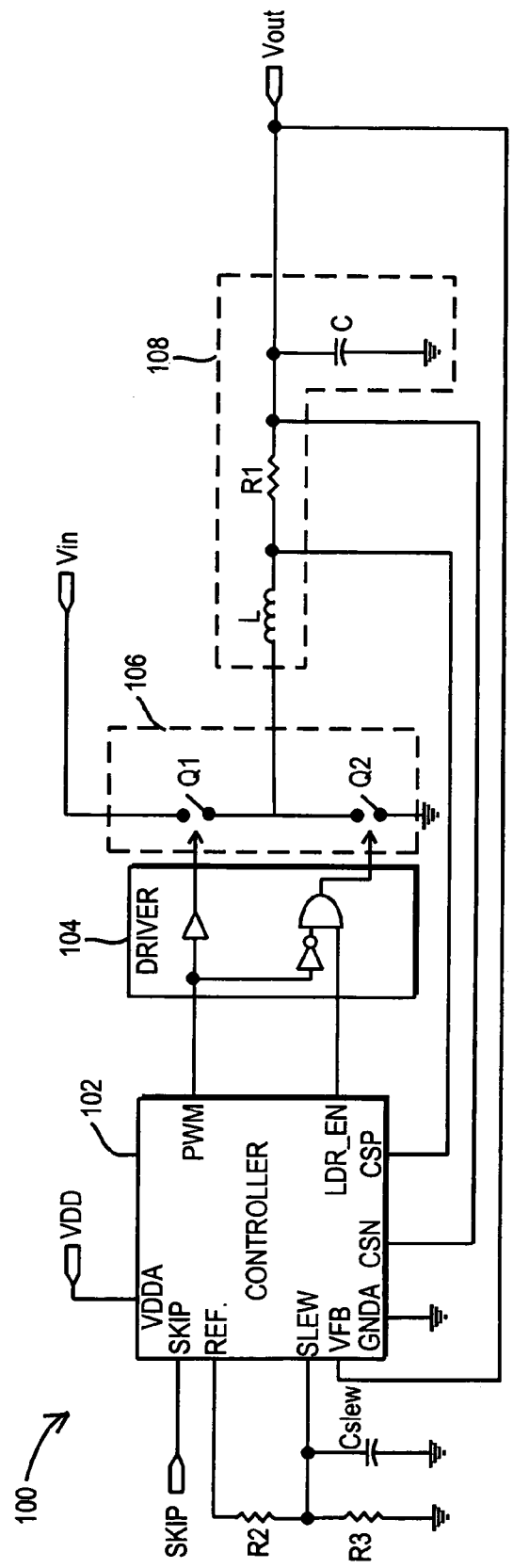
FIG. 1A is a block diagram of a DC to DC converter including a controller consistent with the present invention.

FIG. 1A illustrates an exemplary DC to DC converter 100 including a controller 102 consistent with the present invention. The controller 102 consistent with the invention may be utilized with a variety of DC to DC converters. The illustrated DC to DC converter 100 is a synchronous buck converter generally including the controller 102, a driver circuit 104, a pair of switches 106 including a high side switch Q1 and a low side switch Q2, and a low pass filter 108. The low pass filter includes an inductor L and a capacitor C.

The controller 102 is generally configured to provide a PWM signal and a low side switch enable signal (LDR_EN) to the driver circuit 104. Based on such signals, the driver circuit 104 controls the state of the high side switch Q1 and the low side switch Q2.

The controller 102 has a target input terminal SLEW where the desired output voltage is set. In the exemplary embodiment of FIG. 1, the slew capacitor Cslew charges based on the value of the resistors in the resistor divider R2/R3 and the value of the reference voltage REF. Those skilled in the art will recognize various ways to charge the slew capacitor Cslew and create the target voltage signal. In this instance, the voltage slews from 0 to a set value due to the slew capacitor Cslew. An optional sense resistor R1 may be utilized to provide a feedback voltage level to terminals CSN and CSP of the controller 102 representative of the current level through the inductor L. In addition, terminal VFB of the controller 102 may accept a feedback signal representative of the output voltage level Vout.

Figure 1B:
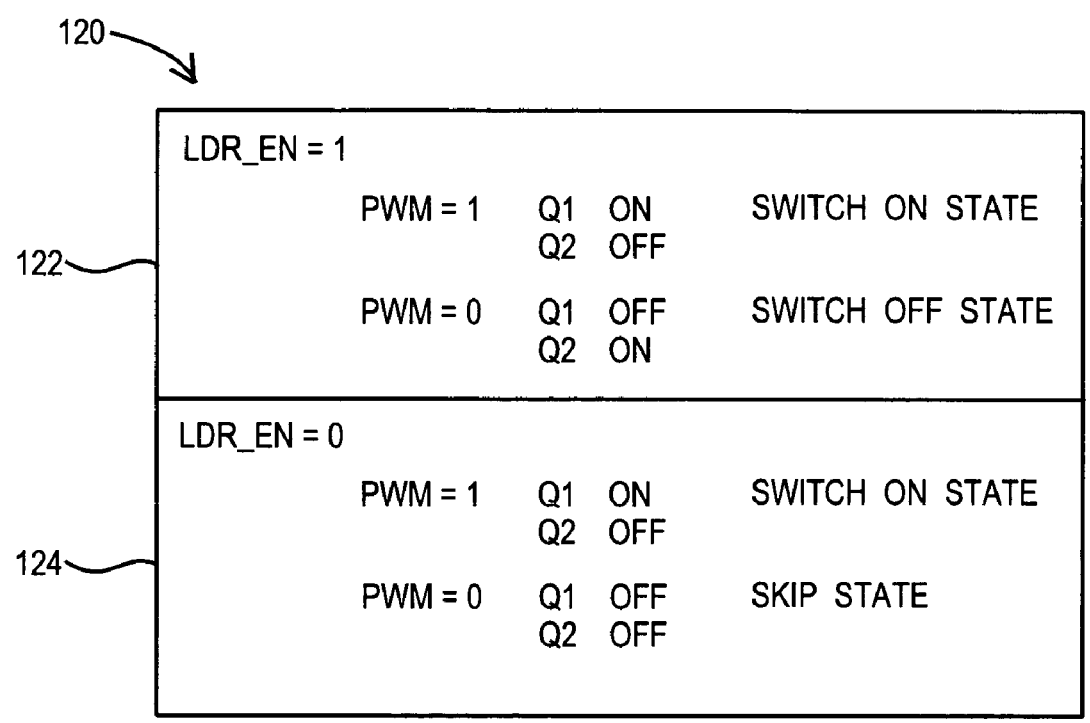
FIG. 1B is an exemplary table illustrating switch states for the pair of switches of FIG. 1A based on the input PWM signal and low side enable signal.

Turning to FIG. 1B, an exemplary table 120 illustrating various switch states of the high side switch Q1 and the low side switch Q2 of FIG. 1A is illustrated for various PWM and LDR_EN signals. If the LDR_EN signal is a digital one as in category 122 of the table 120, then the state of the PWM signal controls the switches Q1 and Q2. For instance, Q1 is ON and Q2 is OFF in this instance 122 if PWM is a digital one. This is referred to as a switch ON state. In addition, Q1 is OFF and Q2 is ON in this instance 122 if PWM is a digital zero. This is referred to as a switch OFF state.

In contrast, if the LDR_EN signal is digital zero and PWM is a digital one, then the switches Q1 and Q2 are in the switch ON state. However, if PWM is a digital zero 20 in this instance, the low side switch Q2 remains open. As such, both the high side switch Q1 and the low side switch Q2 are OFF in this skip state or switch disabled state. The switching side of the inductor L will therefore be left floating in such a skip state.

The inductor L has one end attached to the output DC voltage and the other switch end alternately attached to input voltage Vin or ground depending on the state of the switches Q2 and Q1 (switch ON or switch OFF state). In the switch ON state, the inductor is coupled to input voltage Vin. Neglecting the voltage drop across the sense resistor R1 which is quite small, the voltage difference between the terminals of the inductor L is equal to Vin−Vout. In a buck converter, the input voltage Vin is necessarily larger than the output voltage Vout, so there is a net positive voltage across the inductor and the inductor current ramps up according to equation 1 during the switch ON state.

$$di/dt=(V\text{in}-V\text{out})/L=\Delta I/T\text{on} \quad (1)$$

In equation 1, Vin is the input voltage to the DC to DC converter, Vout is the output voltage of the DC to DC converter, Ton is the time interval duration that the switches Q1 and Q2 are in the switch ON state, L is the value of the inductor L, and ΔI is the change in the inductor current during Ton. During the switch OFF state, the voltage across the inductor L is proportional to Vout. In a buck converter in this instance, there is a net negative voltage across the inductor and the inductor current ramps down according to equation 2.

$$di/dt=(V\text{out})/L=\Delta I/T\text{off} \quad (2)$$

In equation 2, Vout is the output voltage of the DC to DC converter, Toff is the time interval duration that the switches Q1 and Q2 are in the switch OFF state, L is the value of the inductor L, and ΔI is the change in the inductor current during Toff.

Figure 2A:
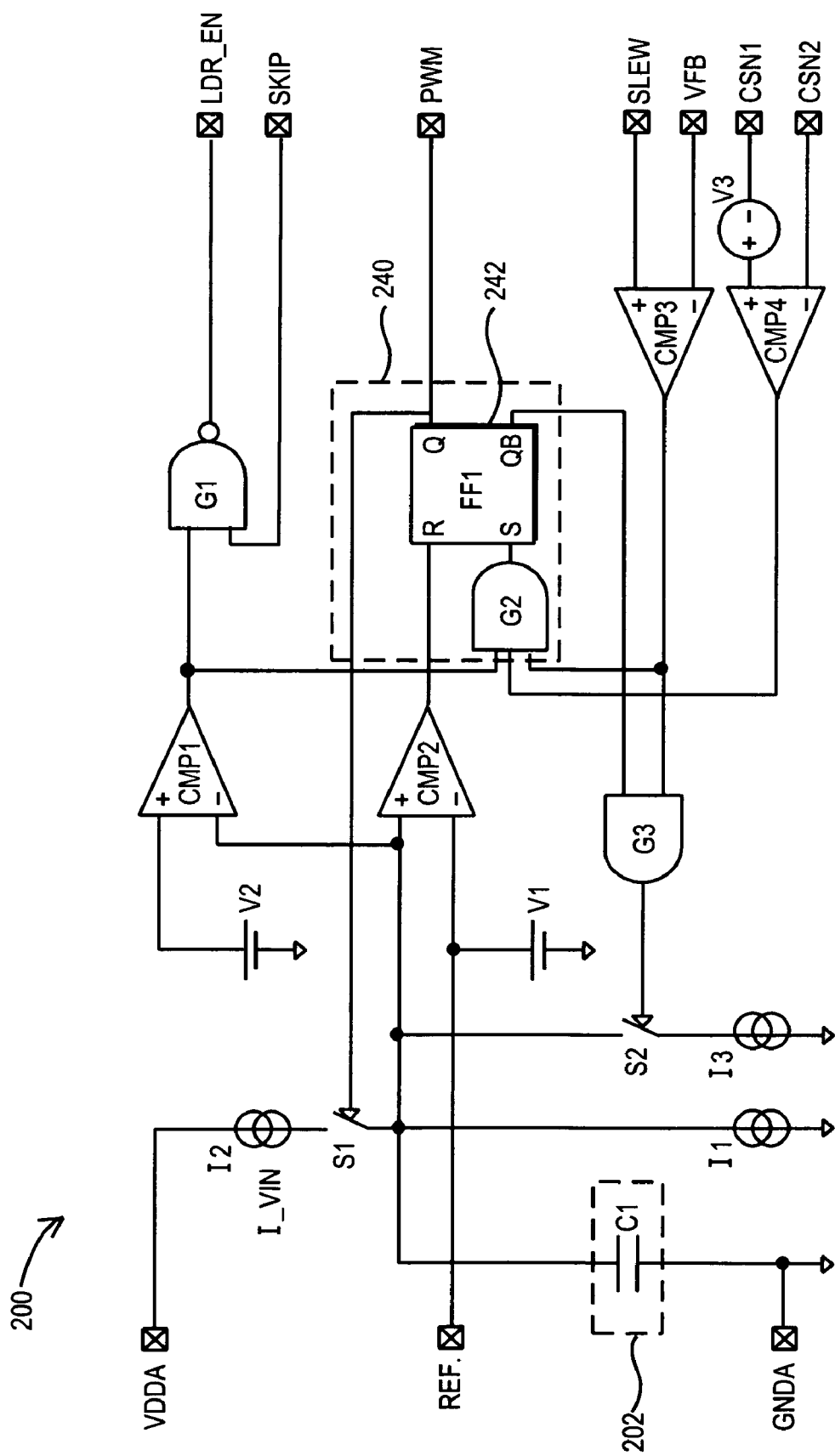
FIG. 2A is a block diagram of one embodiment of a controller for use with the DC to DC converter of FIG. 1.

Turning to FIG. 2A, a more detailed block diagram of one embodiment of a controller 200 for use with the DC to DC converter of FIG. 1 is illustrated. In general, the controller 200 provides a digital one PWM signal to place the switches Q1, Q2 in the switch ON state based on a difference between a first signal representative of the input voltage less a second signal representative of the output voltage. The second signal may be a target voltage level signal, e.g., Vslew, or it may be an output voltage level signal, e.g., Vout. In general, use of a target voltage level signal offers smoother current generation. In a buck converter, the duty cycle of a PWM signal from the controller 200 is generally inversely proportional to the difference between the input voltage and the output voltage or the target voltage. In other words, as this difference increases, the duty cycle of the PWM signal decreases thereby decreasing the "switch ON" time of the switches Q1 and Q2. Conversely, as the difference between the first signal and second signal decreases, the duty cycle of the PWM signal increases thereby decreasing the "switch OFF" time of the switches Q1 and Q2.

In the embodiment of FIG. 2A, such control is generally dictated by charging an energy storage element 202 during a first time interval and discharging the energy storage element 202 during a second time interval. During the first time interval the PWM output signal is a digital one and hence the switches Q1 and Q2 are in the switch ON state and the inductor current rises in proportion to the charge on the energy storage element 202. Once the charge on the energy storage element 202 reaches a predetermined charge threshold level, the PWM signal changes to a digital zero and hence the switches are driven to the switch OFF state. Accordingly, the inductor current then decreases in proportion to the decrease in the charge on the energy storage element 202.

The controller 200 may generally include various current sources I1, I2, and I3 for charging and discharging the energy storage element 202 based on the results of various voltage comparisons by comparators CMP2, CMP3, and CMP4. The first current source I1 is proportional to the output voltage or a target voltage, e.g., Vslew, and configured to provide a first current level and the second current source I2 is proportional to the input voltage of the DC to DC converter and configured to provide a second current level. Finally, a third current source I3 is proportional to the output voltage and configured to provide a third current level which is typically, but not necessarily, greater than the first current level. The third current source I3 is not mandatory. However, it helps to filter out the parasitic triggering of a new PWM pulse. If the third current source I3 is not utilized, switch S2 can directly discharge the energy storage element 202. The controller 200 may also include an output decision circuit 240 to provide the PWM signal to the switch driver circuit.

The controller 200 may further include a first comparator CMP1 that is configured to compare the charge on the energy storage element 202, e.g., capacitor C1, with a second voltage reference V2. The second voltage reference may be a nominal value, e.g., 20 mV in one embodiment, coupled to the positive terminal of the comparator CMP1 such that CMP1 provides a high signal if the charge on the energy storage element is below the nominal V2 value.

The output of the comparator CMP1 may be further coupled to NAND gate G1. A SKIP input may also be coupled to another input of the NAND gate G1. If the SKIP signal is digital zero, then the LDR_EN signal is a digital one regardless of the signal from the comparator CMP1 and hence the PWM signal controls the state of the switches Q1, Q2. If however, SKIP is a digital one and the output from CMP1 is digital one, then the output of NAND gate G1 is a digital zero. As such, if PWM is a digital zero, then both switches Q1 and Q2 will be driven OFF.

In operation, the charge on the energy storage element 202 is initially set at zero volts since it is discharged to ground and the output decision circuit 240 provides a digital zero PWM signal. When the controller is enabled, the SLEW voltage will start to increase from zero towards the ratio based on R2 and R3. The comparator CMP3 will then sense the SLEW voltage is greater than the feedback voltage VFB, which is representative of the output voltage Vout, and provide a digital one signal to the AND gate G2 of the output decision circuit 240.

Since there is no current yet through the inductor L, the comparator CMP4 does not sense an over-current condition and provides a digital one signal to the AND gate G2. In addition, since the charge on the energy storage element 202 element has been discharged to zero volts, the output signal of the comparator CMP1 is also a digital one when comparing the charge to the nominal voltage threshold V2. As such, all input signals to the AND gate G2 are a digital one and the flip flop 242 is set. At that moment, the PWM signal goes to a digital one and switch S1 is closed.

When switch S1 is closed, the energy storage element 202 is charged by a current level equal to the second current level provided by the second current source I2 less the first current level provided by the first current source I1. Advantageously, the first current source I1 may provide a first current level representative of the output voltage, e.g., this may be directly proportional to the output voltage level, e.g., Vout, or a target voltage level, e.g., Vslew or Vtarget. As such, the energy storage element 202 is charged with a current level proportional to I (Vin−Vout) or (Vin−Vslew).

The energy storage element 202 is charged until it reaches a predetermined threshold voltage level, e.g., V1 or 2.5 volts in one embodiment. The comparator CMP2 compares the charge on the energy storage element 202 with the predetermined threshold voltage level V1 and provides an output signal to the output decision circuit 240 based on the difference. If the charge on the energy storage element 202 reaches the predetermined threshold voltage level V1, then comparator CMF2 will output a digital one signal to the reset terminal R of the flip flop 242 resetting the flip flop so its output Q is moved to a digital zero and hence the PWM signal is also moved to a digital zero.

At this time, switch S1 is open since output Q is a digital zero. As such, the energy storage element 202 is now discharged by current source I1. An accelerated discharge of the energy storage element 202 may also occur if the output of the AND gate G3 is a digital one. This occurs if the PWM signal is a digital zero hence one input to the AND gate G3 from the QB terminal of the flip flop 242 is a digital one. In addition, the other input to the AND gate G3 from comparator CMP3 is a digital one if the feedback voltage VFB signal is less than the SLEW voltage. As such, a digital one from the AND gate G3 will close switch S2. As such, a third current source I3 may also be coupled to the energy storage element 202 to provide an accelerated discharge. In one embodiment, the current source I3 has a value of 10×I_Vout, but its value can be adjusted depending on the particular energy storage element 202 and other parameters to find a desired accelerated discharge level. Alternatively, the third current source I3 may be replaced by a short such that switch S2 will discharge the energy storage element to ground.

The voltage level on the energy storage element 202 will continue to be discharged while the PWM signal is a digital zero. It may be discharged at a normal rate or an accelerated rate depending on a comparison of the SLEW voltage with the feedback voltage VFB as provided by comparator CMP3.

Once the voltage level on the energy storage element 202 is discharged to a value less than the nominal threshold level V2 (hence the output of comparator CMP1 is a digital one), and the outputs of comparators CMP3 and CMP4 are also a digital one, a new PWM pulse is generated as the output Q of the flip flop goes to a digital one.

Figure 2B:
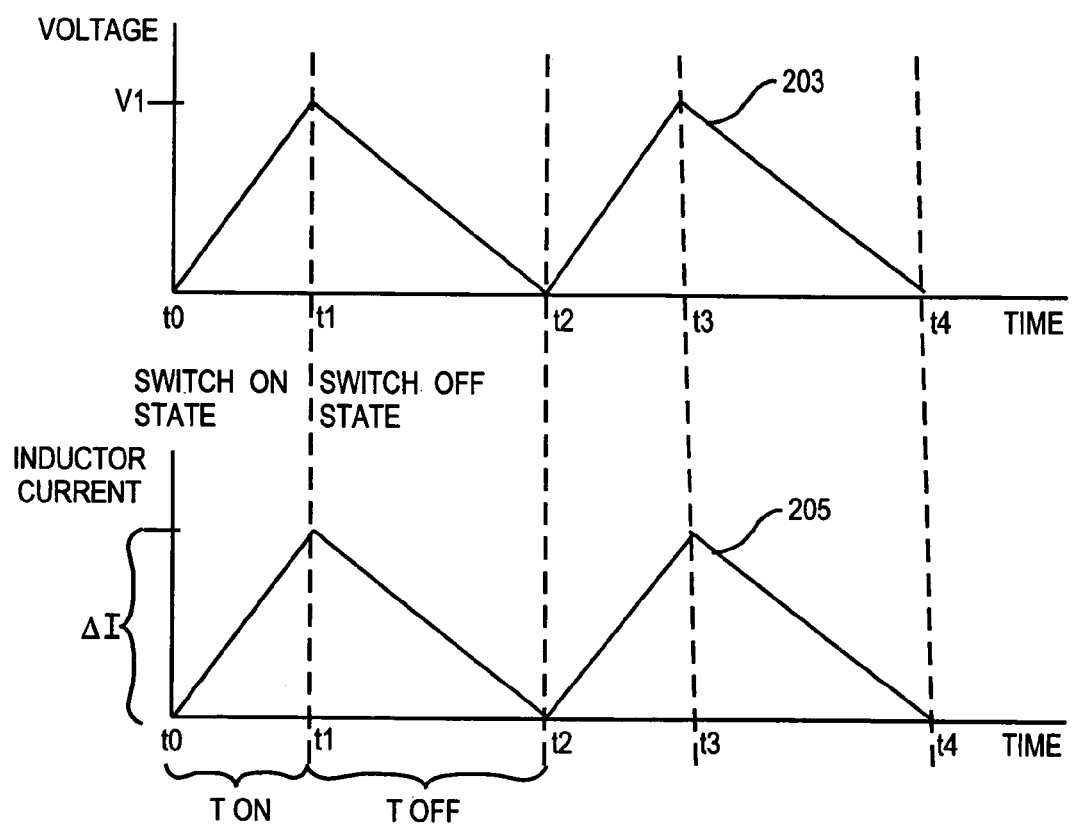
FIG. 2B is a plot illustrating the changes in charge level on the energy storage element of the controller of FIG. 2A compared to the associated changes in inductor current levels over similar time intervals.

Turning to FIG. 2B in conjunction with FIG. 2A, a plot 203 of the voltage level on the energy storage element 202 over time is illustrated. In addition another plot 205 of the inductor current level in inductor L is illustrated over similar time intervals. For instance, at the start time (t0) of operation of the controller 200 the charge on the energy storage element is zero volts. Over a first time interval or Ton between time to and t1 when the PWM output signal is a digital one, the voltage level on the energy storage element 202 rises linearly until the charge level reaches a predetermined charge threshold level V1, e.g., 2.5 volts in one embodiment.

As such, Ton between time t0 and t1 depends on the difference between a signal representative of the input voltage Vin and a signal representative of the output voltage, e.g., Vout or Vtarget, since the energy storage element 202 is charged during this time interval with a current level equal proportionate to this difference (current source I2−I1). The duration of Ton also depends on the threshold voltage level V1 and the value of the energy storage element 202. Where the energy storage element is a capacitor C1 and the second current source is directly proportional to Vout, the duration of the Ton is given by equation 3 below:

$$Ton = C1 * V1 / I(Vin - Vout) \quad (3)$$

Where C1 is the value of the capacitor C1, V1 is predetermined charge threshold level (2.5 volts in one example) and I (Vin−Vout) is the value of the charging current provided by the difference between the second current source I2 and the first current source I1 when the second current source is directly proportional to Vout.

If the Ton as represented in equation (3) is utilized as the Ton for the inductor current in equation (1), then equation (1) can be rewritten as $$\Delta I = (Vin - Vout) * (C1 * V1 / I(Vin - Vout)) / L \quad (4)$$

Since (Vin−Vout)/I(Vin−Vout) is constant then ΔI=constant because every other term (L, V1, and C1) is a constant.

As such, during the Ton state between t0 and t1, the inductor current rises proportionately to the rise in the voltage level of the energy storage element 202. During a second time interval between t1 and t2, the charge level on the energy storage element is decreased due to discharging. In comparison, the inductor current level also decreases over this time period. Advantageously, when the charge level on the energy storage element 202 reaches zero, e.g., at time t2, the inductor current level at time t2 should be zero. As such, the controller 200 also provides a zero crossing inductor current estimator.

The skipping mode when enabled (when the SKIP signal is a digital one) uses this fact that for every PWM pulse the starting inductor current is zero and the energy storage element is completely discharged. When the energy storage element is discharged below the nominal value V2, the output of the comparator CMP1 becomes a digital one. If the skipping mode is enabled then LDR_EN is forced to a digital zero through AND gate G1. So when the inductor current crosses zero, the low side switch Q2 will be OFF as well the high side switch Q1. Therefore, the switching side of the inductor L will be left floating. The skipping mode is useful for light load conditions because a new PWM cycle will start when the load discharges the energy storage element, thus minimizing the Q1 and Q2 switching and conduction losses.

Figure 3:
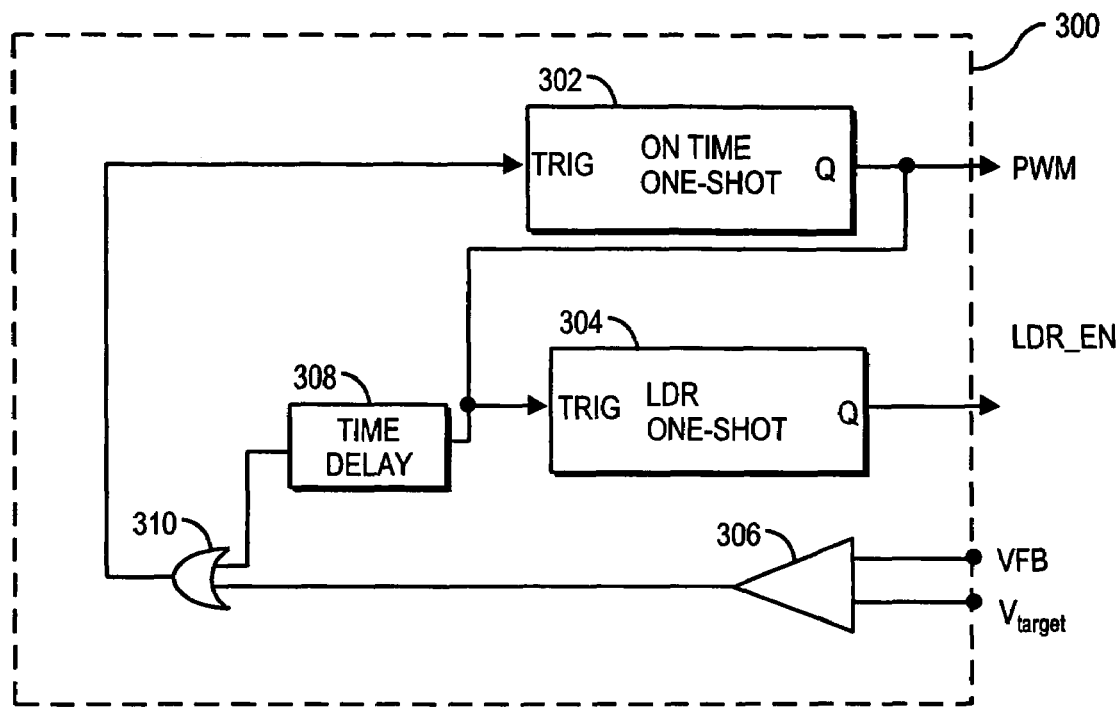
FIG. 3 is a block diagram of another embodiment of a controller for use with the DC to DC converter of FIG. 1.

Turning to FIG. 3, another embodiment of a controller 300 consistent with the invention is illustrated. Similar to the embodiment of FIG. 1A, the controller 300 provides a PWM control signal to an associated driver circuit based on the input voltage to the associated DC to DC converter less a signal representative of the output voltage, e.g., Vout or Vtarget. However, rather than charge and discharge an energy storage element, the controller 300 essentially counts blocks of time and provides the appropriate PWM and LDR_EN signal based on such counts.

For instance, the controller 300 may generally include an on-time one shot circuit 302, a low side driver one shot circuit 304, a comparator 306, a time delay circuit 308, and a NOR gate 310. The time delay circuit 308 may be a blanking circuit for generating retriggering of the on-time one shot circuit 302. The one shot circuits 302 and 304 may be triggered by the falling edge of the input signals.

Ideally, the on-time for the one shot circuit 302 is proportional to difference between the input voltage Vin of the DC to DC converter and a target voltage Vtarget for the output of the DC to DC converter and TLDR is proportional to Vtarget as detailed in equation (5).

$$\frac{T_{on}}{T_{LDR}} \cong \frac{V_{target}}{V_{in} - V_{target}} \quad (5)$$

In practice, $T_{LDR}$ is typically chosen to be slightly shorter than suggested by equation (5). There are several ways to produce $Ton/T_{LDR}$. Typically, Vtarget is either a fixed value or one changing in discrete steps. Both delays for the one shot circuits 302 and 304 can be digital with the actual delay being a multiple of an elementary time delay, e.g., delay To as given by equations (6) and (7) below.

$$Ton=To1*M \quad (6)$$

$$T_{LDR}=To2*N \quad (7)$$

Figure 4:
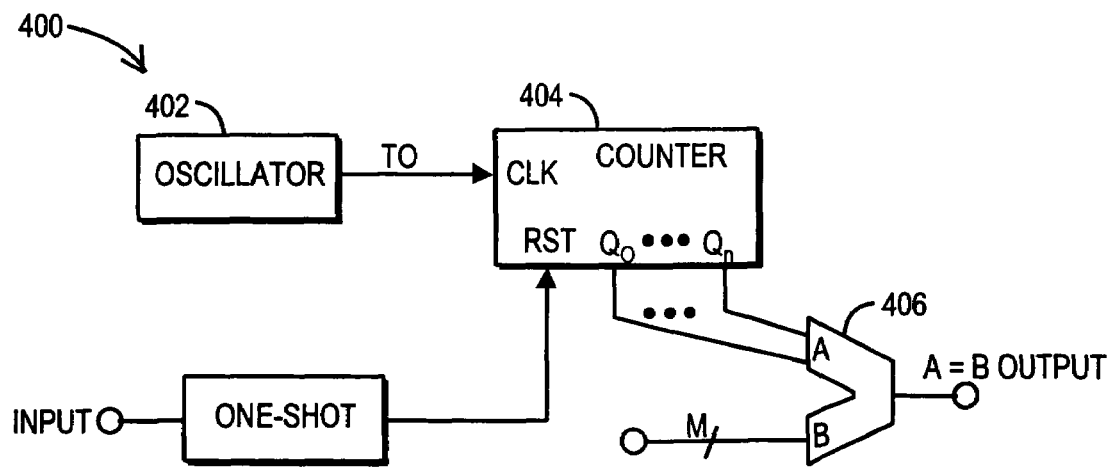
FIG. 4 is a more detailed block diagram of an exemplary delay circuit of FIG. 3.

Turning to FIG. 4, an exemplary delay circuit 400 is illustrated for producing the desired delay to maintain a proper time on for the on-time one shot circuit 302. The delay circuit 400 generally includes an oscillator 402 for producing time pulses, a counter 404 for counting the time pulses, and a digital comparator 406 for comparing the counted value to an applicable multiple such as M or N. The comparator thus provides an output signal indicative of whether or not the counter 404 has reached the necessary amount of counts M or N. Therefore, the applicable on time is controlled by counting the number of counts compared to the multiple M or N.

Hence controlling the multiple M and N essentially selects the applicable delay. Since Ton is a function of Vin and Vtarget and $T_{LDR}$ is a function of Vtarget, there are a couple of ways to control them. In a first case, To1 and To2 are equal and constant. As such, the multiple N may be produced by a lookup table (LUT) from the digital signal that sets Vtarget. The LUT in this instance is one dimensional since various N values correspond to an associated Vtarget value. In the same case where To1 and To2 are equal and constant, the multiple M may be produced by a LUT from both the digital signal that sets Vtarget and a digitalized Vin signal. Such a digitalized Vin signal may be obtained by utilizing an A/D converter on Vin. As such, the LUT to produce M in this instance is bi-dimensional since M values correspond to an associated Vtarget and Vin values.

In another case, To1 and To2 are not equal. In this case, the multiple N is produced similarly as in the first case if To2 is constant. The multiple M may be produced by a uni-dimensional LUT having as an input the digital signal that sets Vtarget. However, To1 is not longer fixed but a function of either Vin or a function of both Vin and Vtarget.

Figure 5:
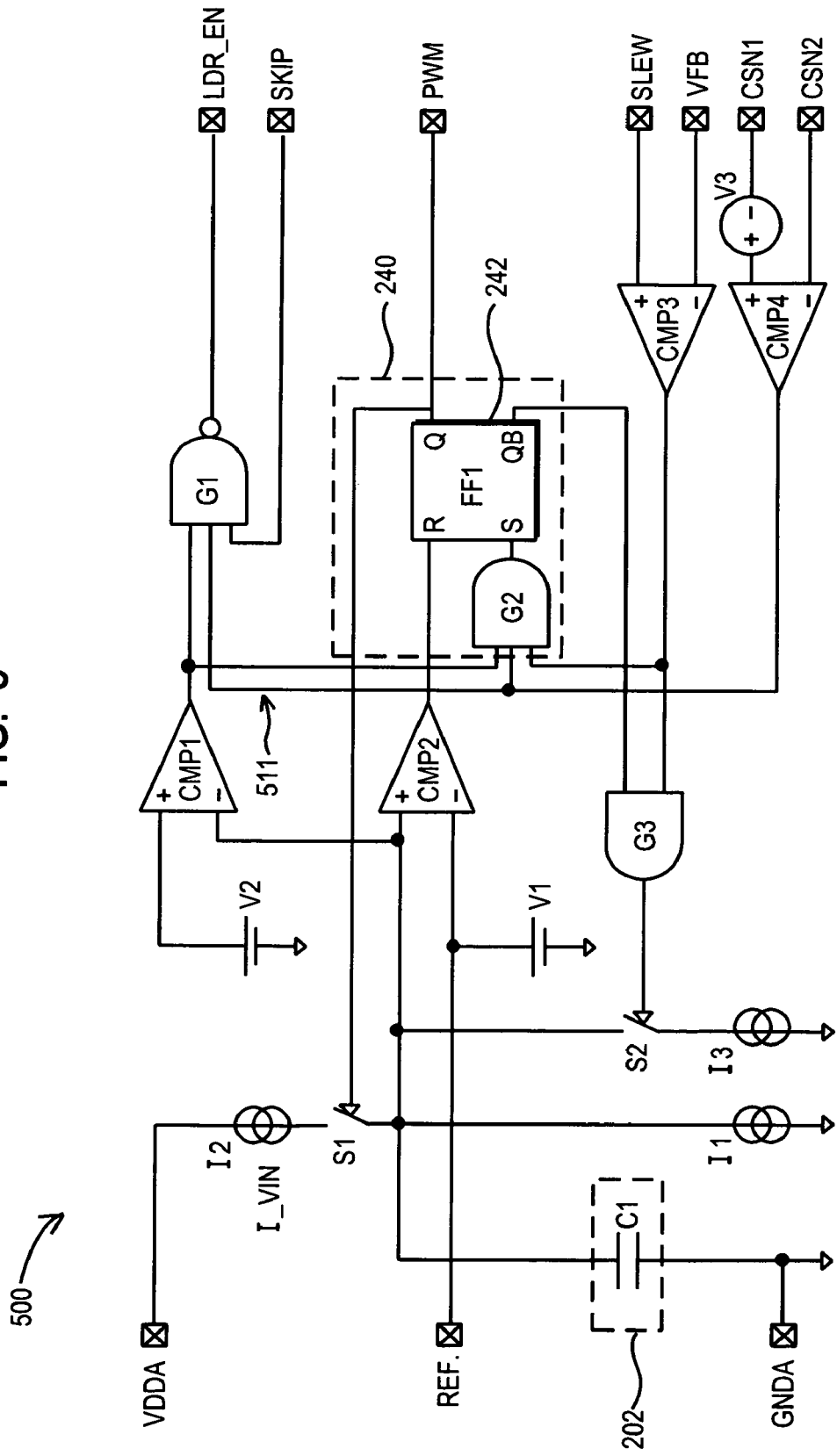
FIG. 5 is a block diagram of another embodiment of a controller for use with the DC to DC converter of FIG. 1.

Turning to FIG. 5, another controller 500 consistent with the invention that may be utilized as the controller for use with the DC to DC converter of FIG. 1 is illustrated. Many elements of the controller 500 of FIG. 5 are similar to that of the controller 200 of FIG. 2A and, as such, are labeled similarly. Hence any repetitive description of similar elements that was already detailed with respect to FIG. 2A is omitted herein for clarity, and rather the differences between FIG. 2A and FIG. 5 are detailed. In general, the controller 500 has an additional connection 511 coupling the output of comparator CMP4 to the input of NAND gate G1.

The NAND gate G1 now accepts three inputs including a first input from comparator CMP1, a second input from the SKIP terminal, and a third input from comparator CMP4. If any of these three inputs to the NAND gate G1 is a digital zero, then the output of the NAND gate G1 is a digital one. This is particularly useful in SKIP mode during an over current situation. In this case, the output of comparator CMP4 would be a digital zero, and the output voltage of the DC to DC converter would drop such that the output of comparator CMP3 would be a digital one. As such, switch S2 would close accelerating the discharge on the energy storage element 202. With the added connection 511 between comparator CMP4 and NAND gate G1, as long as the output of comparator CMP4 is a digital zero, the output of the NAND gate G1 is digital one and hence LDR_EN is a digital one keeping the low side switch Q2 turned ON. When all three inputs to the NAND gate G1 are high, the LDR_EN signal goes low. At the same moment, the flip flop FF1 is set by the output of AND gate G2 starting a new PWM cycle.

Figure 6:
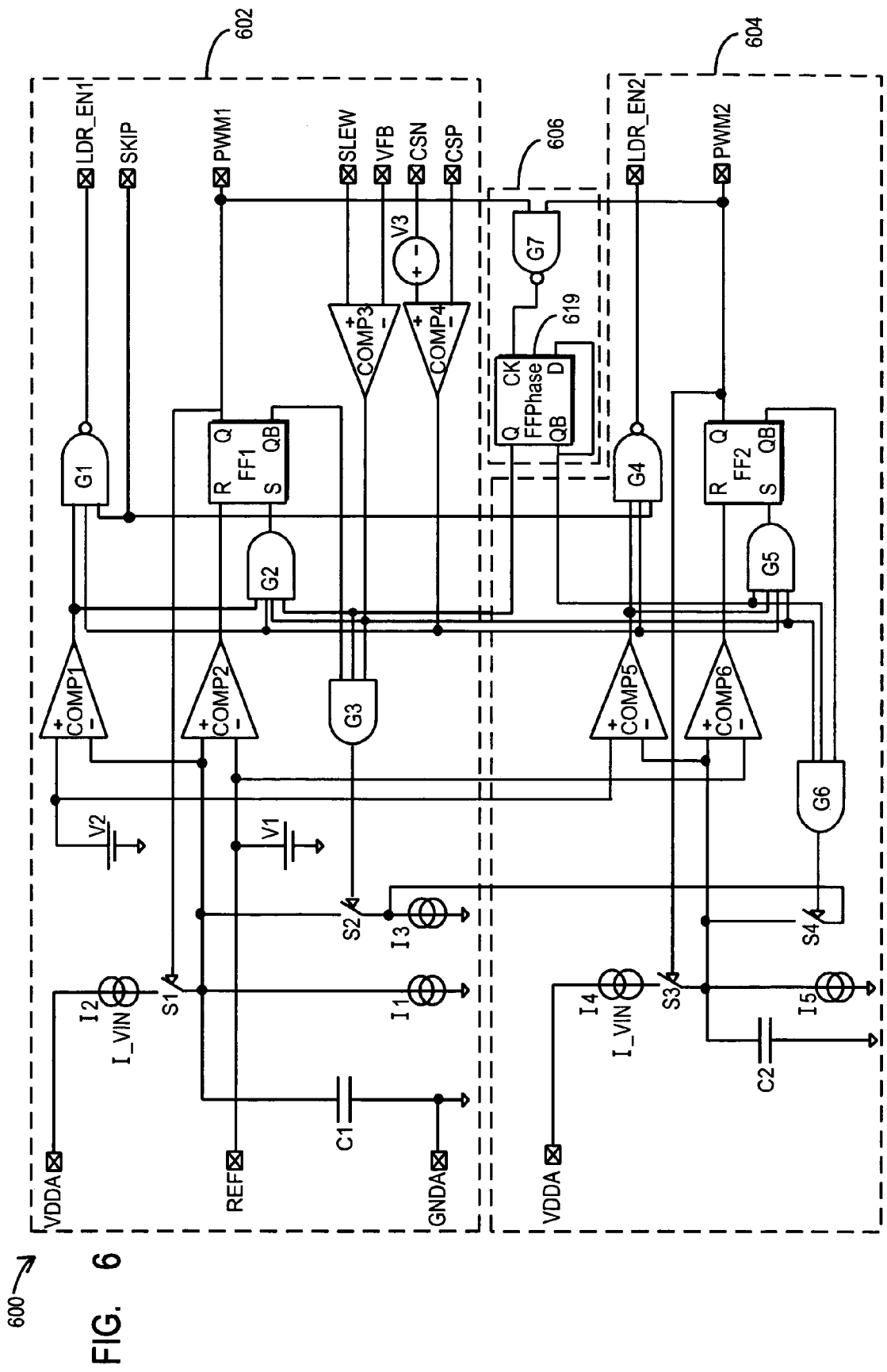
FIG. 6 is a block diagram of an exemplary dual phase controller.

FIG. 6 illustrates a dual phase controller 600 consistent with the invention. In general, the dual phase controller 600 includes a first phase controller 602, a second phase controller 604, and a phase selection circuit 606 that selects between the phase controllers 602 and 604 to allow one to generate a PWM control signal at any one time. Most components of the first phase controller 602 and second phase controller 604 are similar to the components of the controller 500 of FIG. 5 (with reference also to the controller 200 of FIG. 2A as applicable). Hence any repetitive description of similar components and operation thereof already detailed is omitted herein for clarity The phase selection circuit 606 enables only one of the phase controllers 602, 604 to generate a PWM at any one time. Any variety of circuit configurations may be utilized to achieve the desired function of the phase selection circuit 606. In one embodiment, the phase selection circuit 606 may include a flip flop 619 and NAND gate G7. The NAND gate G7 may accept a first PWM signal PWM1 from the first phase controller 602 and a second PWM signal PWM2 from the second phase controller 604. The output of NAND gate G7 may then be fed to the clock "CK" terminal of flip flop 619. The "Q" terminal of flip flop 619 may be coupled to an input of AND gate G2 of the first phase controller 602 and the "QB" terminal of the flip flop 619 may be coupled to an input of AND gate G5 of the second phase controller 604. All inputs to the respective AND gates G2 and G5 must be a digital one in order to provide a digital one output to set the associated flip flop FF1 or FF2. Given that "QB" is the complement of "Q" this circuitry assures that the setting of the flip flops FF1 and FF2 will occur at different times.

In operation, after the first phase controller 602 generates a PWM pulse, the flip flop 619 changes state on the falling edge of the PWM pulse at the PWM1 terminal. This allows the second phase controller 604 to generate a PWM pulse at the PWM2 terminal. When the feedback voltage VFB drops below the SLEW voltage, the second phase controller 604 generates a PWM pulse at the PWM2 terminal. The falling edge of this PWM pulse again changes the state of the flip flop 619. Therefore, the next PWM pulse is generated by the first controller 602 at the PWM1 terminal. The process continues with the flip flop 619 changing state at the falling edge of each PWM pulse. In a SKIP mode, the PWM pulses are nicely interleaved since there is a separate LDR_EN pulse estimator, e.g., LDR_EN1 and LDR_EN2, on each controller 602, 604.

Figure 7:
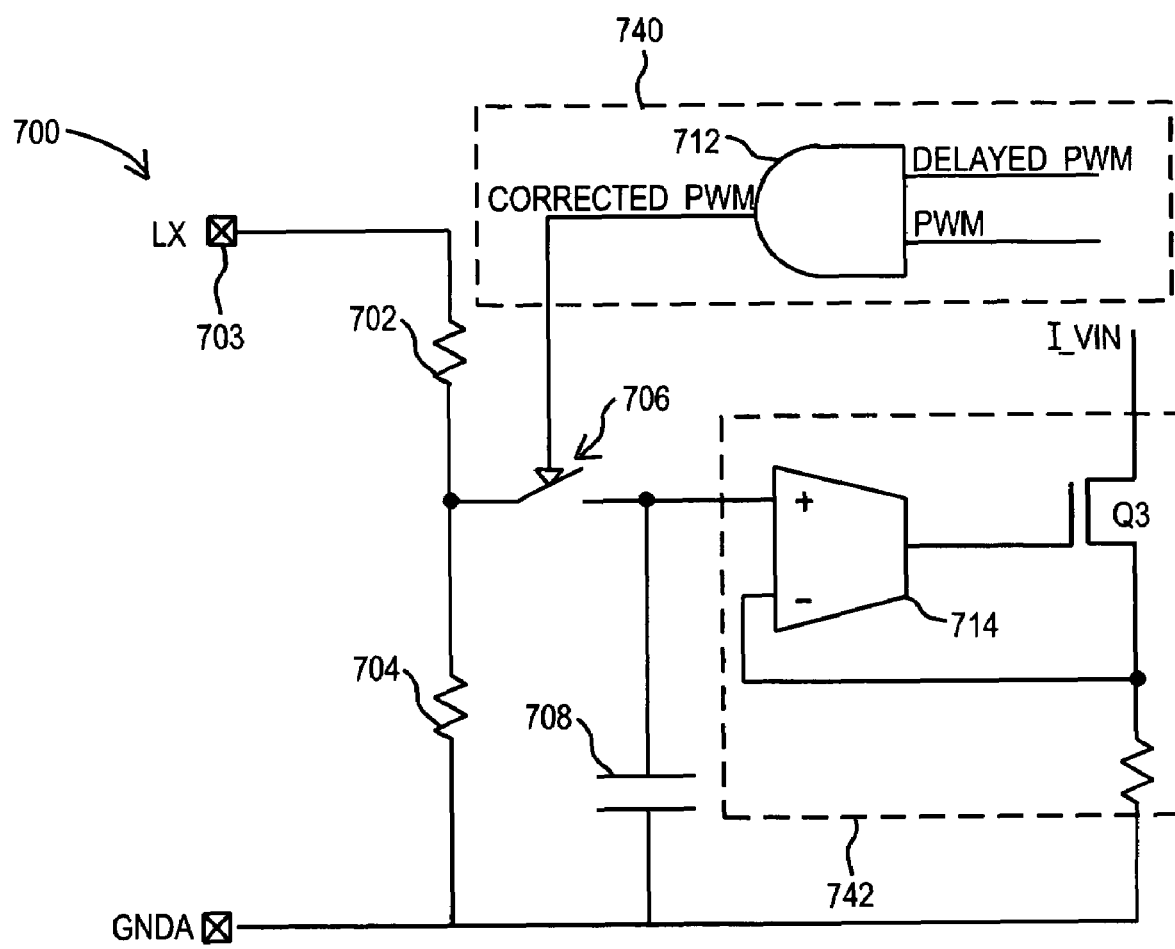
FIG. 7 is a circuit diagram of an input voltage sensing circuit using the LX pin of the controller.

Turning to FIG. 7, there is illustrated an input voltage sensing circuit 700 consistent with the invention that does not require a separate input pin on the controller. As such, the overall pin count on the controller may be reduced. The input voltage sensing circuit 700 receives an input signal at a terminal LX pin 703. The LX pin 703 is coupled to the switching node 715 (see FIG. 9) of the DC to DC converter. The switching node 715 may be coupled to an input voltage when the high side switch Q1 is closed and the low side switch Q2 is open. The switching node 715 may be coupled to ground when the high side switch Q1 is open and the low side switch Q2 is closed. In addition, the switching node 715 may be left floating in the skip state where both Q1 and Q2 are open.

In general, the input voltage sensing circuit 700 may have a switch state determination circuit 740 and a voltage sensing circuit 742. The switch state determination circuit 740 determines when the high side switch Q1 is closed and the low side switch Q2 is open so that the switching node 715 is coupled to the input voltage. The switch state determination circuit 740 then provides a determination signal to the voltage sensing circuit 742 to have the voltage sensing circuit sense a voltage representative of the voltage at the LX pin 703.

The switch state determination circuit 740 may include an AND gate 712. When both the delayed PWM signal and the PWM signal received by the AND gate 712 are a digital one, the output of the AND gate 712 is also a digital one, which in turn closes switch 706. The input voltage sensing circuit may also include a pair of resistors 702, 704 forming a voltage divider to scale down the voltage seen at the LX pin 703 to a lower level. In one embodiment, the resistor 702 may be 210 KOhms and the resistor 704 may be 30 KOhms.

When the switch state determination circuit 740 determines the voltage at the switch node 715 is representative of the input voltage level (e.g., both PWM signals to AND gate 712 are high) it closes switch 706. The voltage sensing circuit 742 may include a transconductance amplifier 714 and transistor Q3. The transconductance amplifier 714 may receive an input signal at its noninverting input terminal representative of the input voltage and provide a signal to the control electrode of transistor Q3. Transistor Q3 may then provide a signal, e.g., I_Vin, representative of the input voltage level. Accordingly, an input voltage sensing circuit 700 is provided that does not require a separate input pin on the controller. As such, the overall pin count on the controller may be reduced. In addition, if you have a dual phase controller in one chip similar to the controller 600 of FIG. 6, each controller can sense its own input voltage which can be different. For instance, the first controller may convert the battery voltage −16V down to 2.5V and the second controller may convert 5V input voltage down to 1.5V. Both controllers will work correctly.

Figure 8:
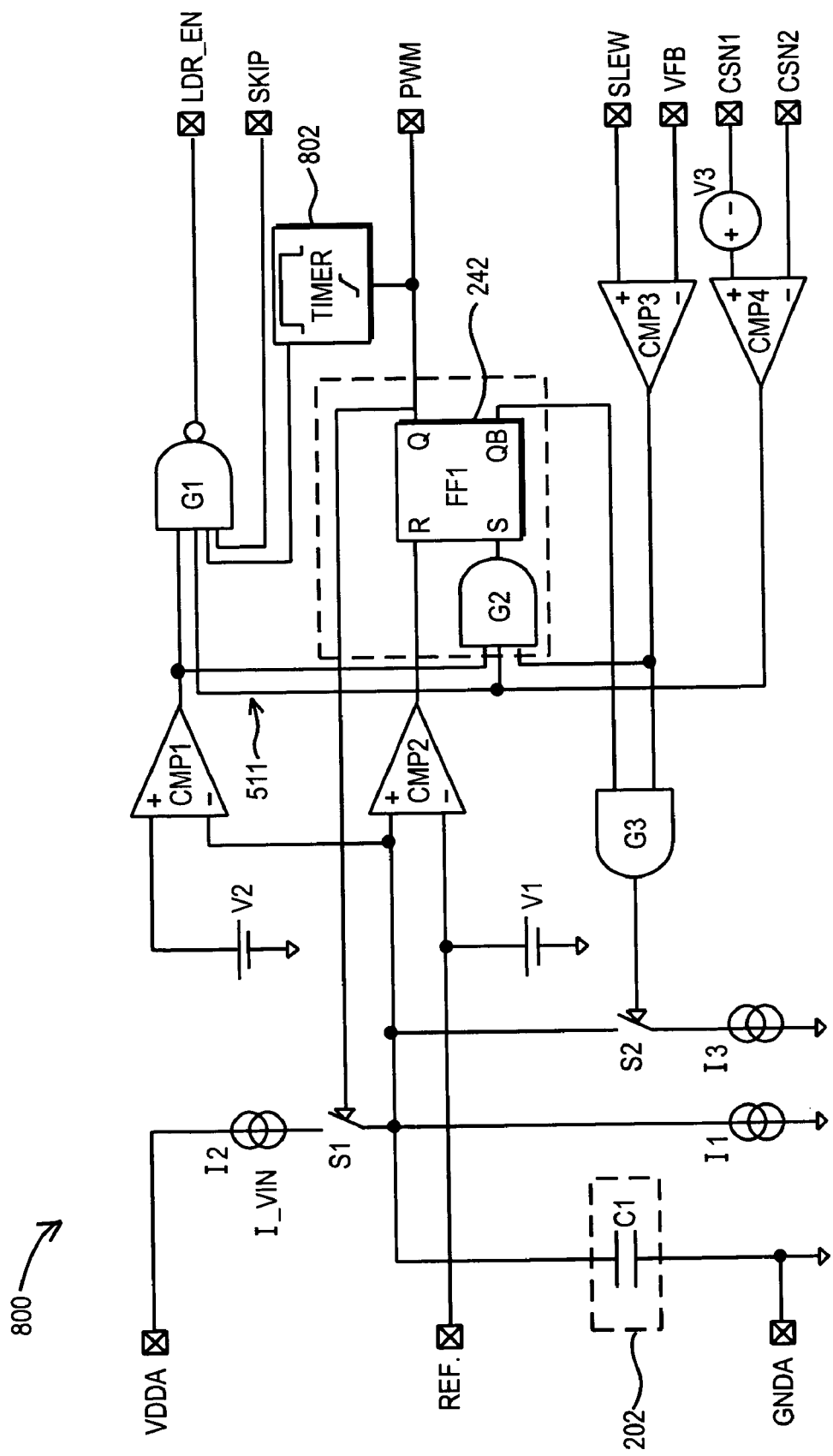
FIG. 8 is a block diagram of another embodiment of a controller consistent with the invention having an internal timer for controlling a minimum switching frequency.
Figure 9:
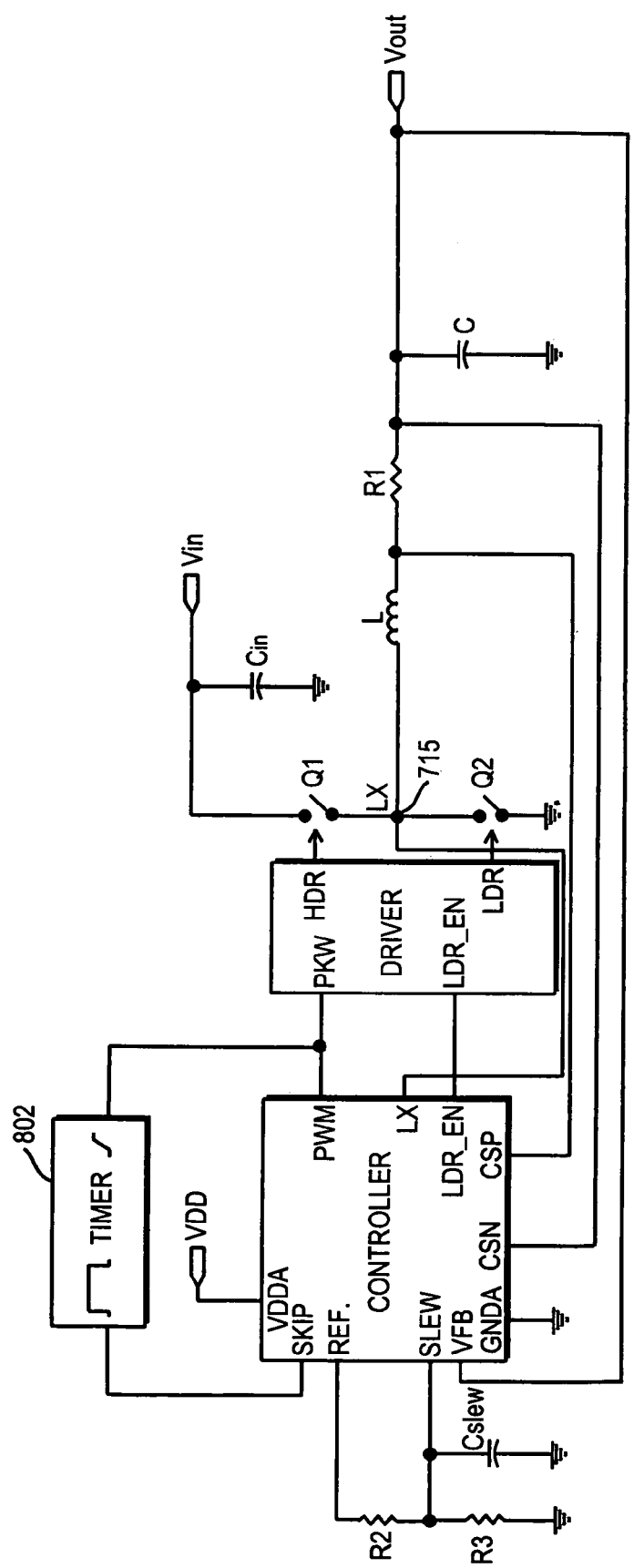
FIG. 9 is a block diagram of a DC to DC converter having a timer external the controller for controlling a minimum switching frequency.

Turning to FIG. 8, a timer 802 is added internally to the controller 800 between the PWM terminal and an input to NAND gate G1. FIG. 9 illustrates an external implementation of the timer 802 between the PWM and SKIP terminals of the controller. The timer 802 starts a time count at the leading edge of a periodic control signal, e.g., a PWM signal, which controls the state of the high side Q1 and low side Q2 switch as further detailed herein with reference to the timing diagram of FIG. 10. The timer 802 assures that switches change state at a frequency greater than the audio frequency range detectable by humans, e.g., about 20 kHz to 25 kHz, as further detailed herein by controlling the frequency of the periodic control signal.

Figure 10:
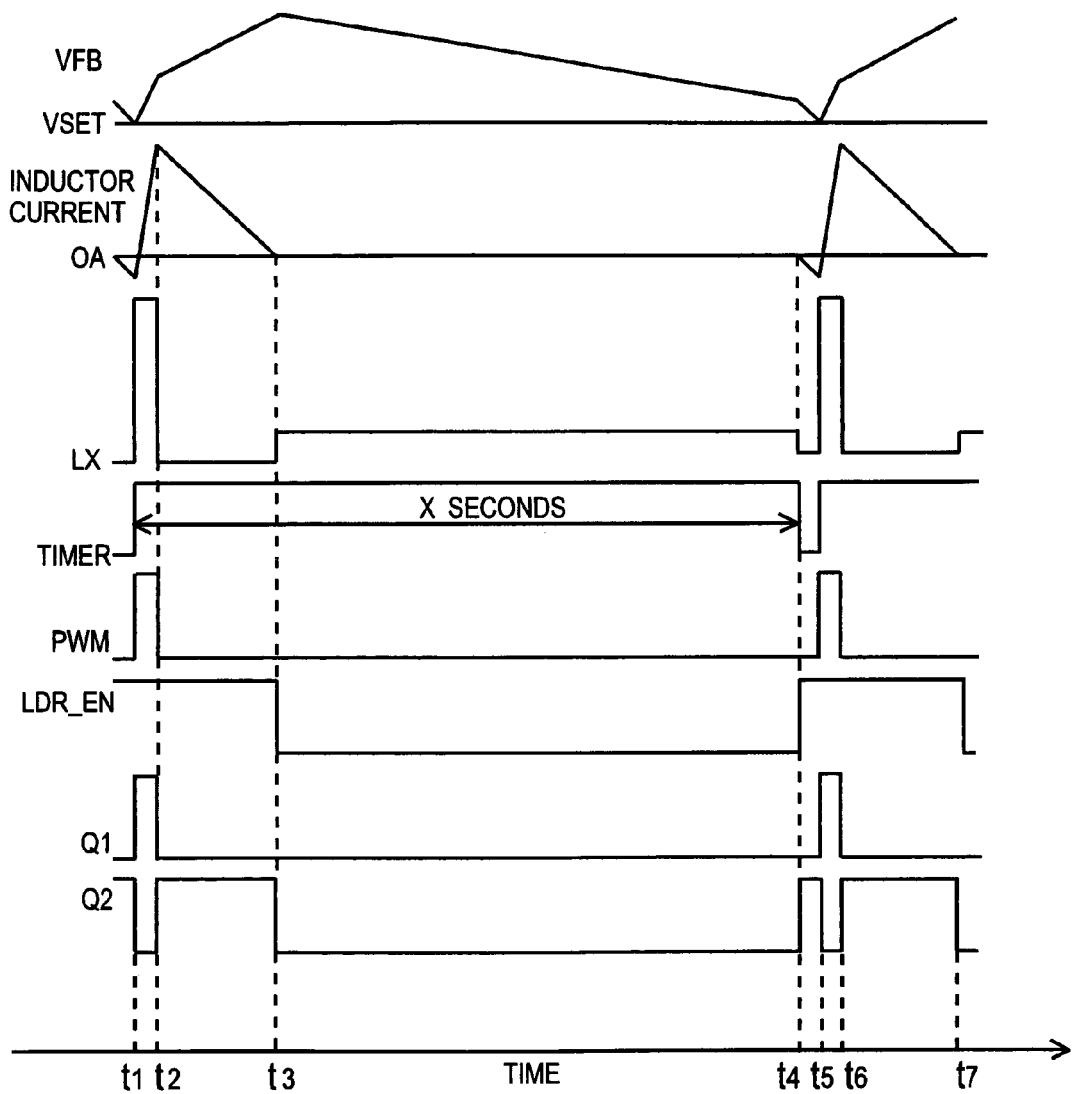
FIG. 10 is a timing diagram for the embodiments of FIGS. 9 and 10.

As illustrated in the timing diagram of FIG. 10, at time t1 a PWM pulse is generated. Between time t1 and t2, the PWM pulse is a digital one. Hence the high side switch Q1 is ON and the low side switch Q2 is OFF. In addition, the low side enable signal LDR_EN is also a digital one during the time interval between t1 and t2. Accordingly, the inductor current rises during this "switch ON" state.

Between times t2 and t3, the PWM signal is a digital zero and the LDR_EN signal is a digital one. Hence, the high side switch Q1 is OFF and the low side switch Q2 is ON over this time interval. Accordingly, the inductor current falls during this "switch OFF" state until it reaches zero at time t3. At time t3, the LDR_EN signal changes to a digital zero. Since the PWM signal is also a digital zero at this time, the skip state is entered at time t3. As such, the high side switch Q1 and the low side switch Q2 are both OFF in the skip state between time t3 and t4.

A new PWM pulse will be generated if the output voltage, as viewed at the feedback terminal VFB of the controller drops below the set voltage level VSET. In addition, the timer 802 also operates to assure the output voltage drops to the VSET level. For instance, the timer starts counting at the leading edge of the PWM pulse or at time t1 for a predetermined time interval (x seconds). In the embodiment of FIG. 8, the timer provides a digital one signal to the NAND gate G1 during this time interval between times t3 and t4.

After the predetermined time limit (x seconds) expires at time t4, the LDR_EN signal goes to a digital one. In the embodiment of FIG. 8 this is because the timer signal input to NAND gate G1 has changed to a digital zero forcing the output of the NAND gate G1 or LDR_EN to go to a digital one. In the embodiment of FIG. 9, the timer 802 controls the state of the input to the SKIP terminal and hence provides the same affect as the timer of FIG. 8. That is, when the predetermined time limit expires, the LDR_EN signal goes to a digital one. Hence, the skip mode is no longer enabled and the low side switch Q2 is turned on at time t4. The output voltage will start to drop once the low side switch Q2 is turned ON since the output capacitor C is discharged via the inductor low side switch path to ground. When the output voltage drops below the set voltage VSET, e.g., at time t5, a new PWM pulse is generated and the process starts again.

Advantageously, the timer 802 can have a time limit chosen to ensure a minimum frequency of the PWM pulses when utilizing a skipping mode and hence a minimum frequency of a change in switch states. Advantageously, the time limit may be chosen to result in a frequency of the PWM pulses that is greater than an audible range for humans. The average audible range for humans is between 20 kHz and 25 kHz. To keep the frequency at a minimum of 20 kHz, the time limit may be set at 50 microseconds. To keep the frequency at an even higher level of 25 kHz, the time limit may be set at 40 microseconds. Hence, by properly choosing the time limit of the timer 802, the minimum switching frequency of the high side Q1 and low side Q2 switch can be maintained at a range, e.g., greater than about 20 kHz, that is higher than the average audible range for humans. Though presented in terms of a controller for a DC to DC converter, those skilled in the art will recognize that such a timer may be utilized in any variety of switching circuits where a minimum switching frequency is desired to avoid an audible switching noise for humans.

In summary, there is thus provided a switching circuit comprising at least one switch and a controller. The controller may be configured to control a state of the at least one switch. The controller may have a skip mode wherein the controller maintains the at least one switch in an OFF state. The controller may be responsive to a timer. The timer may be configured to count for a time interval, and the controller may be responsive to expiration of the time interval to disable the skip mode so that the at least one switch changes states at a frequency rate greater than an audible frequency limit for humans.

In another embodiment, there is also provided a method. The method comprises starting a time count of a time interval at a start of a state change of a switch of a DC to DC converter; monitoring if the switch is in a skip mode; and disabling the skip mode in response to an expiration of the time interval so that the switch changes states at a frequency rate greater than an audible frequency for humans.

In yet another embodiment there is provided a DC to DC converter comprising a high side and low side switch and a controller. The controller may be configured to control a state of the high side and low side switch. The controller may have a skip mode wherein the low side and high side switch are open. The controller may be responsive to a timer. The timer may be configured to count for a time interval, and the controller may be responsive to expiration of the time interval to disable the skip mode so that the high side switch changes states at a frequency rate greater than an audible frequency limit for humans.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A switching circuit comprising:
   at least one switch; and
   a controller configured to control a state of said at least one switch, said controller having a skip mode wherein said controller maintains said at least one switch in an OFF state, said controller responsive to a timer, said timer configured to count for a time interval, said controller responsive to expiration of said time interval to disable said skip mode so that said at least one switch changes states at a frequency rate greater than an audible frequency limit for humans.

2. The switcbing circuit of claim 1, wherein said timer is coupled to an output terminal of said controller.

3. The switching circuit of claim 1, wherein said timer is an internal component of said controller.

4. The switching circuit of claim 1, wherein said controller is configured to control said state of said at least one switch with a periodic control signal, and wherein said timer is configured to count for said time interval upon a start of a period of said periodic control signal.

5. The switching circuit of claim 4, wherein said periodic control signal comprises a pulse width modulated signal.

6. A method comprising:
   starting a time count of a time interval at a start of a state change of a switch of a DC to DC converter;
   monitoring if said switch is in a skip mode; and
   disabling said skip mode in response to an expiration of said time interval so that said switch changes states at a frequency rate greater than an audible frequency for humans.

7. The method of claim 6, wherein said switch comprises a high side switch of a DC to DC converter, and said DC to DC converter also comprises a low side switch, said low and high side switch being open in said skip mode.

8. The method of claim 7, wherein said disabling said skip mode in response to expiration of said time interval comprises closing said low side switch so that said high side switch changes states at said frequency rate greater than said audible frequency for humans.

9. The method of claim 8, further comprising controlling said high and low side switches with a periodic control signal, and wherein said closing of said low side switch causes discharging of an output capacitor of said DC to DC converter.

10. The method of claim 9, wherein said periodic control signal comprises a pulse width modulated signal, and wherein a new pulse of said pulse width modulated signal is generated to turn on said high side switch when a voltage level of said output capacitor decreases to a set voltage level.

11. A DC to DC converter comprising:
    a high side and low side switch and
    a controller configured to control a state of said high side and low side switch, said controller having a skip mode wherein said low side and high side switch are open, said controller responsive to a timer, said timer configured to count for a time interval, said controller responsive to expiration of said time interval to disable said skip mode so that said high side switch changes states at a frequency rate greater than an audible frequency limit for humans.

12. The DC to DC convener of claim 11, wherein said controller disables said skip mode in response to expiration of said time interval by closing said low side switch.

13. The DC to DC converter of claim 12, wherein said controller controls said state of said high and low side switches with aperiodic control signal, and wherein said closing of said low side switch causes discharging of an output capacitor of said DC to DC converter.

14. The DC to DC converter of claim 13, wherein said periodic control signal comprises a pulse width modulated signal, and wherein a new pulse of said pulse width modulated signal is generated to turn on said high side switch when a voltage level of said output capacitor decreases to a set voltage level.

15. The DC to DC convener of claim 11, wherein said timer is coupled to an output terminal of said controller.

16. The DC to DC convener of claim 11, wherein said timer is an internal component of said controller.

* * * * *

UNITED STATES PATENT AND TRADEMARK OFFICE
CERTIFICATE OF CORRECTION

| | | |
|---|---|---|
| PATENT NO. | : 7,098,642 B2 | Page 1 of 1 |
| APPLICATION NO. | : 11/037598 | |
| DATED | : August 29, 2006 | |
| INVENTOR(S) | : Lipcsei et al. | |

It is certified that error appears in the above-identified patent and that said Letters Patent is hereby corrected as shown below:

On the title page, item (73), in "Assignee", in column 1, line 2, delete "Grand Cayman (KY)" and insert -- Grand Pavillion Commercial Centre West Bay Road, PO Box 32331 SMB, Georgetown Grand Cayman, Cayman Islands, BWI --, therefor.

In column 11, line 47, in Claim 2, delete "switcbing" and insert -- switching --, therefor.

In column 12, line 29, in Claim 11, after "switch" insert -- ; --.

In column 12, line 39, in Claim 12, delete "convener" and insert -- converter --, therefor.

In column 12, line 44, in Claim 13, delete "aperiodic" and insert -- a periodic --, therefor.

In column 12, line 53, in Claim 15, delete "convener" and insert -- converter --, therefor.

In column 12, line 55, in Claim 16, delete "convener" and insert -- converter --, therefor.

Signed and Sealed this

First Day of July, 2008

JON W. DUDAS
*Director of the United States Patent and Trademark Office*